(12) United States Patent
Chen et al.

(10) Patent No.: US 9,285,917 B2
(45) Date of Patent: Mar. 15, 2016

(54) LIQUID CRYSTAL DISPLAY HAVING PHOTO-SENSING INPUT MECHANISM

(71) Applicant: AU Optronics Corp., Hsin-Chu (TW)

(72) Inventors: Pei-Yi Chen, Hsin-Chu (TW);
Hsueh-Ying Huang, Hsin-Chu (TW);
Jian-Shen Yu, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 0 days.

(21) Appl. No.: 14/517,945

(22) Filed: Oct. 20, 2014

(65) Prior Publication Data

US 2015/0035805 A1      Feb. 5, 2015

Related U.S. Application Data

(62) Division of application No. 13/346,740, filed on Jan. 10, 2012, now Pat. No. 8,890,783.

(30) Foreign Application Priority Data

Mar. 17, 2011   (TW) .................................. 100109160

(51) Int. Cl.
*G09G 3/36* (2006.01)
*G06F 3/042* (2006.01)
*G06F 3/041* (2006.01)
*G02F 1/1333* (2006.01)

(52) U.S. Cl.
CPC .......... *G06F 3/0416* (2013.01); *G02F 1/13338* (2013.01); *G06F 3/042* (2013.01); *G06F 3/0412* (2013.01)

(58) Field of Classification Search
CPC ... G02F 1/13338; G06F 3/042; G06F 3/0416; G06F 3/0412
See application file for complete search history.

(56) References Cited

U.S. PATENT DOCUMENTS

| 7,009,663 B2 | 3/2006 | Abileah |
| 7,580,084 B2 | 8/2009 | Yu et al. |
| 2006/0279690 A1 | 12/2006 | Yu |
| 2007/0109239 A1 | 5/2007 | den Boer |
| 2010/0026636 A1 | 2/2010 | Jang |
| 2011/0001711 A1 | 1/2011 | Choi |
| 2011/0012844 A1* | 1/2011 | Chang ................... G06F 3/0412 345/173 |
| 2012/0138919 A1 | 6/2012 | Lan |

FOREIGN PATENT DOCUMENTS

| CN | 1877401 A | 12/2006 |
| CN | 101943974 A | 1/2011 |
| CN | 101859784 B | 1/2012 |
| TW | I320861 | 2/2010 |
| TW | 201103257 | 1/2011 |

* cited by examiner

*Primary Examiner* — Charles Hicks
(74) *Attorney, Agent, or Firm* — Winston Hsu; Scott Margo

(57) ABSTRACT

A liquid crystal display having photo-sensing input mechanism includes a first gate line for transmitting a first gate signal, a second gate line for transmitting a second gate signal, a data line for transmitting a data signal, a pixel unit for outputting an image signal according to the first gate signal and the data signal, a readout line for transmitting a readout signal, a photo-sensing input unit and a driving adjustment unit. The photo-sensing input unit is utilized for generating a sensing voltage according to a driving voltage and an incident light signal, and is further utilized for outputting the readout signal according to the sensing voltage and the first gate signal. The driving adjustment unit is employed to provide the driving voltage according to the second gate signal and the incident light signal.

4 Claims, 6 Drawing Sheets

LIQUID CRYSTAL DISPLAY HAVING PHOTO-SENSING INPUT MECHANISM

CROSS REFERENCE TO RELATED APPLICATIONS

This is a division of U.S. application Ser. No. 13/346,740, filed on Jan. 10, 2012.

BACKGROUND OF THE INVENTION

1. Field of the Invention

The disclosure relates to a liquid crystal display, and more particularly, to a liquid crystal display having photo-sensing input mechanism.

2. Description of the Prior Art

Along with the requirement of a friendly communication interface for a user to interact with an electronic device, an input-type display device for controlling operations of the electronic device, instead of using a keyboard or a mouse, has steadily become the mainstream, thereby making application of input-type display devices increasingly widespread. The input mechanisms of the input-type display devices are primarily classified into the photo-sensing input mechanism and the touch-sensing input mechanism. Since the display device with the touch-sensing input mechanism is likely to be damaged by frequent touch action, the lifetime of the display device with the photo-sensing input mechanism is normally greater than that of the display device with the touch-sensing input mechanism. In general, the photocurrent/bias-voltage characteristic curve of a photo-sensing transistor used in the photo-sensing input mechanism is changing following a change of incident light intensity. Under fixed bias voltage, the photocurrent increase as the incident light intensity increases, which is employed to perform an input sensing operation. For instance, a first photocurrent generated in response to a first incident light intensity can be used to indicate a first input state, and a second photocurrent generated in response to a second incident light intensity lower than the first incident light intensity can be used to indicate a second input state. The first photocurrent is greater than a predetermined threshold and the second photocurrent is less than the predetermined threshold. However, the aforementioned photocurrent/bias-voltage characteristic curve may be shifted due to long-term bias/irradiation operation, and the photocurrent corresponding to the same bias voltage and the same incident light intensity is growing as the bias/irradiation operation proceeds. That is, after long-term bias/irradiation operation, the second photocurrent maybe greater than the predetermined threshold, which in turn causes input state misjudgment and results in malfunction of backend circuit.

SUMMARY OF THE INVENTION

In accordance with an embodiment, a liquid crystal display having photo-sensing input mechanism is provided. The liquid crystal display comprises a first gate line for transmitting a first gate signal, a second gate line for transmitting a second gate signal, a data line for transmitting a data signal, a pixel unit, a photo-sensing input unit, a driving adjustment unit, and a readout line. The pixel unit, electrically connected to the first gate line and the data line, is utilized for outputting an image signal according to the first gate signal and the data signal. The photo-sensing input unit, electrically connected to the first gate line, is utilized for generating a sensing voltage according to a driving voltage and an incident light signal, and for outputting a readout signal according to the sensing voltage and the first gate signal. The driving adjustment unit, electrically connected to the second gate line and the photo-sensing input unit, is utilized for providing the driving voltage according to the second gate signal and the incident light signal. The readout line, electrically connected to the photo-sensing input unit, is employed to transmit the readout signal.

The present invention further provides a photo-sensing input device comprising a photo-sensing input unit and a driving adjustment unit. The photo-sensing input unit is put in use for generating a sensing voltage according to a driving voltage and an incident light signal, and for outputting a readout signal according to the sensing voltage and a first gate signal. The driving adjustment unit, electrically connected to the photo-sensing input unit, is utilized for providing the driving voltage according to a second gate signal and the incident light signal.

These and other objectives of the present invention will no doubt become obvious to those of ordinary skill in the art after reading the following detailed description of the preferred embodiment that is illustrated in the various figures and drawings.

DETAILED DESCRIPTION

Hereinafter, preferred embodiments of the present invention will be described in detail with reference to the accompanying drawings. Here, it is to be noted that the present invention is not limited thereto.

Figure 1:
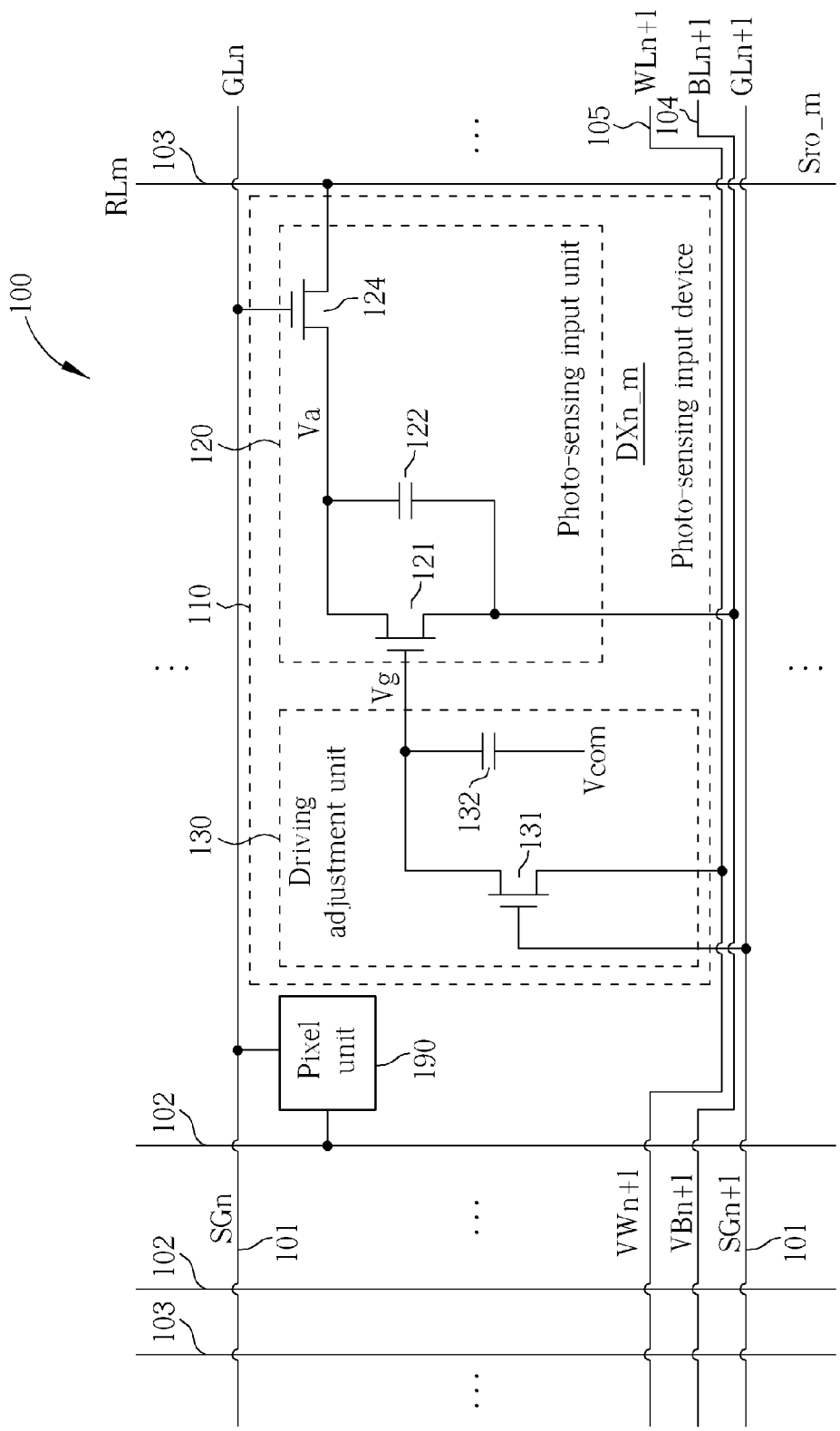
FIG. 1 is a schematic diagram showing a liquid crystal display having photo-sensing input mechanism in accordance with a first embodiment.

FIG. 1 is a schematic diagram showing a liquid crystal display 100 having photo-sensing input mechanism in accordance with a first embodiment. As shown in FIG. 1, the liquid crystal display 100 comprises a plurality of gate lines 101, a plurality of data lines 102, a plurality of readout lines 103, a plurality of bias lines 104, a plurality of preliminary bias lines 105, a plurality of pixel units 190, and a plurality of photo-sensing input devices 110. Each gate line 101 is employed to transmit one corresponding gate signal. Each data line 102 is employed to transmit one corresponding data signal. Each pixel unit 190 is employed to output one corresponding image signal through writing one corresponding data signal under the control of one corresponding gate signal. Each bias line 104 is employed to transmit one corresponding bias signal. Each preliminary bias line 105 is employed to transmit one corresponding preliminary bias signal. Each readout line 103, electrically connected to plural photo-sensing input devices 110, is employed to transmit one corresponding readout signal. In the embodiment shown in FIG. 1, each pixel unit 190 is adjacent to one photo-sensing input device 110. In another embodiment, the photo-sensing input devices 110 may be separated by a plurality of gate lines 101 or a plurality of data lines 102, such that not every pixel unit 190 is adjacent to a photo-sensing input device 110. Correspondingly, the bias lines 104 and the preliminary bias lines 105 may be separated by a plurality of gate lines 101, or the readout lines 103 may be separated by a plurality of data lines 102.

Each photo-sensing input device 110 includes a photo-sensing input unit 120 and a driving adjustment unit 130. The photo-sensing input unit 120 is utilized for generating a sensing voltage according to a driving voltage and an incident light signal, and further for outputting a readout signal according to the sensing voltage and one gate signal. The driving adjustment unit 130 is utilized for providing the driving voltage according to another gate signal and the incident light signal. The photo-sensing input unit 120 comprises a first transistor 121, a first capacitor 122, and a second transistor 124. The driving adjustment unit 130 comprises a third transistor 131 and a second capacitor 132. In the following, photo-sensing input device DXn_m is employed to illustrate interconnections and circuit functions regarding the components in the photo-sensing input devices 110.

The first transistor 121 comprises a first end electrically connected to the bias line BLn+1 for receiving the bias signal VBn+1, a gate end for receiving the driving voltage Vg, and a second end for outputting the sensing voltage Va. The first transistor 121 may be a photo-sensing thin film transistor (TFT) or a photo-sensing field effect transistor (FET). The first capacitor 122 is electrically connected between the first and second ends of the first transistor 121. The second transistor 124 comprises a first end electrically connected to the second end of the first transistor 121, a gate end electrically connected to the gate line GLn for receiving the gate signal SGn, and a second end for outputting the readout signal Sro_m to the readout line RLm. The second transistor 124 maybe a thin film transistor or a field effect transistor. The third transistor 131 comprises a first end electrically connected to the preliminary bias line WLn+1 for receiving the preliminary bias signal VWn+1, a gate end electrically connected to the gate line GLn+1 for receiving the gate signal SGn+1, and a second end electrically connected to the gate end of the first transistor 121. The third transistor 131 may be a photo-sensing thin film transistor or a photo-sensing field effect transistor. The second capacitor 132 comprises a first end electrically connected to the second end of the third transistor 131, and a second end for receiving a common voltage Vcom.

Figure 2:
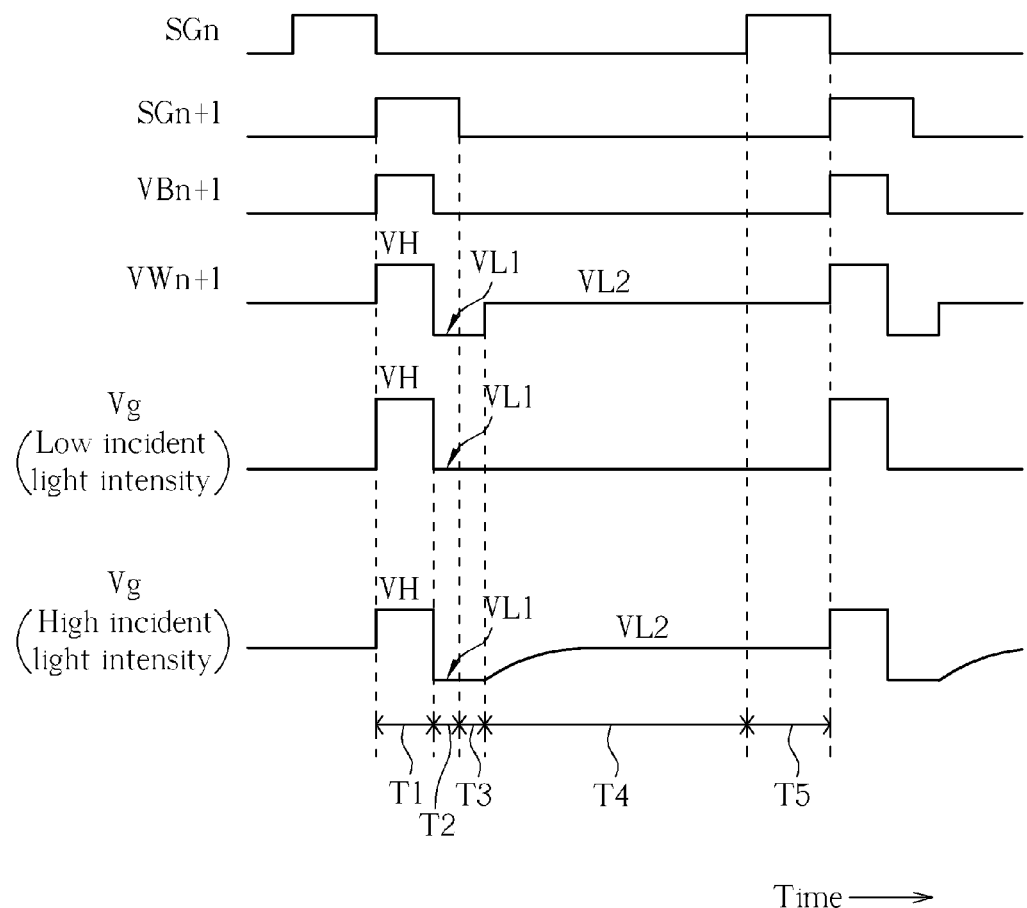
FIG. 2 is a schematic diagram showing related signal waveforms regarding the operation of the liquid crystal display illustrated in FIG. 1, having time along the abscissa.

FIG. 2 is a schematic diagram showing related signal waveforms regarding the operation of the liquid crystal display 100 illustrated in FIG. 1, having time along the abscissa. The signal waveforms in FIG. 2, from top to bottom, are the gate signal SGn, the gate signal SGn+1, the bias signal VBn+1, the preliminary bias signal VWn+1, the driving voltage Vg corresponding to low incident light intensity, and the driving voltage Vg corresponding to high incident light intensity. Referring to FIG. 2 in conjunction with FIG. 1, during an interval T1, the third transistor 131 is turned on by the gate signal SGn+1 having high level voltage, and the driving voltage Vg is then pulled up to a voltage VH according to the preliminary bias signal VWn+1 at the voltage VH, thereby turning on the first transistor 121. At this time, the sensing voltage Va is pulled up to a start voltage by the bias signal VBn+1 having high level voltage via the first transistor 121. During an interval T2, the gate signal SGn+1 having high level voltage continues turning on the third transistor 131, such that the driving voltage Vg can be pulled down a voltage VL1 by the preliminary bias signal VWn+1 at the voltage VL1 via the third transistor 131, thereby turning off the first transistor 121. During an interval T3, the gate signal SGn+1 having low level voltage is employed to turn off the third transistor 131, and the driving voltage Vg is retained at the voltage VL1. During an interval T4, the preliminary bias signal VWn+1 is switched from the voltage VL1 up to a voltage VL2. During an interval T5, the gate signal SGn having high level voltage is employed to turn on the second transistor 124 for outputting the readout signal Sro_m.

Regarding the operation of the photo-sensing input device DXn_m corresponding to low incident light intensity, because the photocurrent of the third transistor 131 is nearly zero, the driving voltage Vg is substantially retained at the voltage VL1 during the interval T4. That is, as the sensing voltage Va decreases from the start voltage through performing a discharging operation of the first capacitor 122, the gate voltage of the first transistor 121 is substantially retained at the voltage VL1, such that the photocurrent of the first transistor 121 can be less than a predetermined threshold. Regarding the operation of the photo-sensing input device DXn_m corresponding to high incident light intensity, the preliminary bias signal VWn+1 at the voltage VL2 can be employed to significantly charge the second capacitor 132 based on the photocurrent of the third transistor 131, for pulling the driving voltage Vg from the voltage VL1 up to the voltage VL2. That is, as the sensing voltage Va decreases from the start voltage through performing a discharging operation of the first capacitor 122, the gate voltage of the first transistor 121 is substantially retained at the voltage VL2 greater than the voltage VL1, such that the photocurrent of the first transistor 121 can be greater than the predetermined threshold.

To sum up, in the photo-sensing operation of the photo-sensing input device 110, the driving voltage Vg (VL1) corresponding to low incident light intensity is less than the driving voltage Vg (VL2) corresponding to high incident light intensity, i.e. the voltage applied to the gate of the first transistor 121 is adjusted in response to incident light intensity. In view of that, even through the photocurrent/bias-voltage characteristic curve of the first transistor 121 is shifted due to long-term bias/irradiation operation, by means of applying the voltage VL1 significantly lower than the voltage VL2, the photocurrent of the first transistor 121 corresponding to low incident light intensity can be still less than a predetermined threshold, and therefore the operation of the photo-sensing input device 110 is able to achieve high input reliability for avoiding an occurrence of input state misjudgment.

Figure 3:
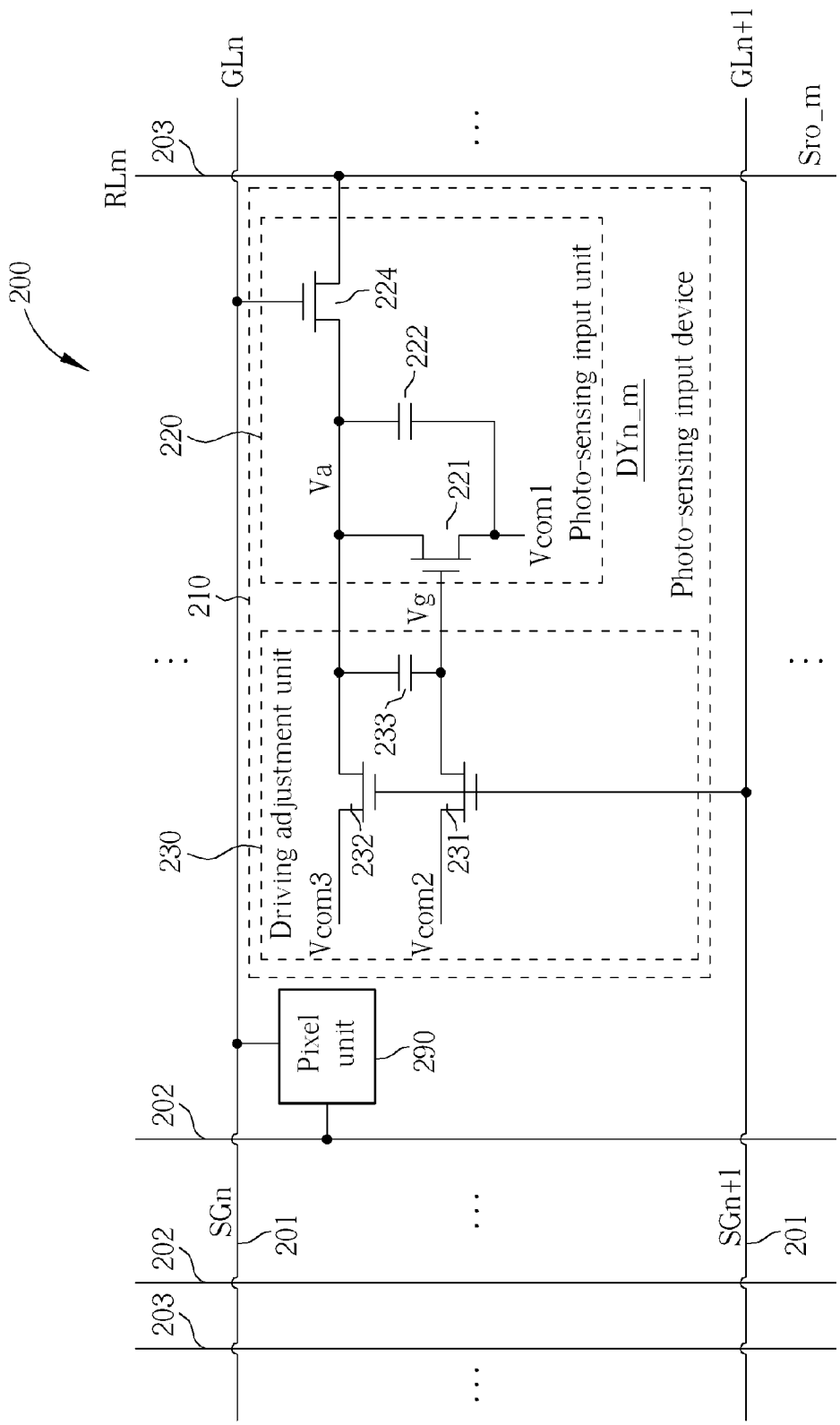
FIG. 3 is a schematic diagram showing a liquid crystal display having photo-sensing input mechanism in accordance with a second embodiment.

FIG. 3 is a schematic diagram showing a liquid crystal display 200 having photo-sensing input mechanism in accordance with a second embodiment. As shown in FIG. 3, the liquid crystal display 200 comprises a plurality of gate lines 201, a plurality of data lines 202, a plurality of readout lines 203, a plurality of pixel units 290, and a plurality of photo-sensing input devices 210. Each gate line 201 is employed to transmit one corresponding gate signal. Each data line 202 is employed to transmit one corresponding data signal. Each pixel unit 290 is employed to output one corresponding image signal through writing one corresponding data signal under the control of one corresponding gate signal. Each readout line 203, electrically connected to plural photo-sensing input devices 210, is employed to transmit one corresponding readout signal. In the embodiment shown in FIG. 3, each pixel unit 290 is adjacent to one photo-sensing input device 210. In another embodiment, the photo-sensing input devices 210 may be separated by a plurality of gate lines 201 or a plurality of data lines 202, such that not every pixel unit 290 is adjacent to a photo-sensing input device 210. Correspondingly, the readout lines 203 may be separated by a plurality of data lines 202.

Each photo-sensing input device 210 includes a photo-sensing input unit 220 and a driving adjustment unit 230. The photo-sensing input unit 220 is utilized for generating a sensing voltage according to a driving voltage and an incident light signal, and further for outputting a readout signal according to the sensing voltage and one gate signal. The driving adjustment unit 230 is utilized for providing the driving voltage according to another gate signal and the incident light signal. The photo-sensing input unit 220 comprises a first transistor 221, a first capacitor 222, and a second transistor 224. The driving adjustment unit 230 comprises a third transistor 231, a fourth transistor 232, and a second capacitor 233. In the following, photo-sensing input device DYn_m is employed to illustrate interconnections and circuit functions regarding the components in the photo-sensing input devices 210.

The first transistor 221 comprises a first end for receiving a first common voltage Vcom1, a gate end for receiving the driving voltage Vg, and a second end for outputting the sensing voltage Va. The first transistor 221 may be a photo-sensing thin film transistor or a photo-sensing field effect transistor. The first capacitor 222 is electrically connected between the first and second ends of the first transistor 221. The second transistor 224 comprises a first end electrically connected to the second end of the first transistor 221, a gate end electrically connected to the gate line GLn for receiving the gate signal SGn, and a second end for outputting the readout signal Sro_m to the readout line RLm. The second transistor 224 may be a thin film transistor or a field effect transistor. The third transistor 231 comprises a first end for receiving a second common voltage Vcom2, a gate end electrically connected to the gate line GLn+1 for receiving the gate signal SGn+1, and a second end electrically connected to the gate end of the first transistor 221. The third transistor 231 may be a thin film transistor or a field effect transistor. The fourth transistor 232 comprises a first end for receiving a third common voltage Vcom3, a gate end electrically connected to the gate line GLn+1 for receiving the gate signal SGn+1, and a second end electrically connected to the second end of the first transistor 221. The fourth transistor 232 may be a thin film transistor or a field effect transistor. The second capacitor 233 is electrically connected between the second end of the third transistor 231 and the second end of the fourth transistor 232. In one embodiment, the second common voltage Vcom2 is less than the first common voltage Vcom1, and the third common voltage Vcom3 is greater than the first common voltage Vcom1.

Figure 4:
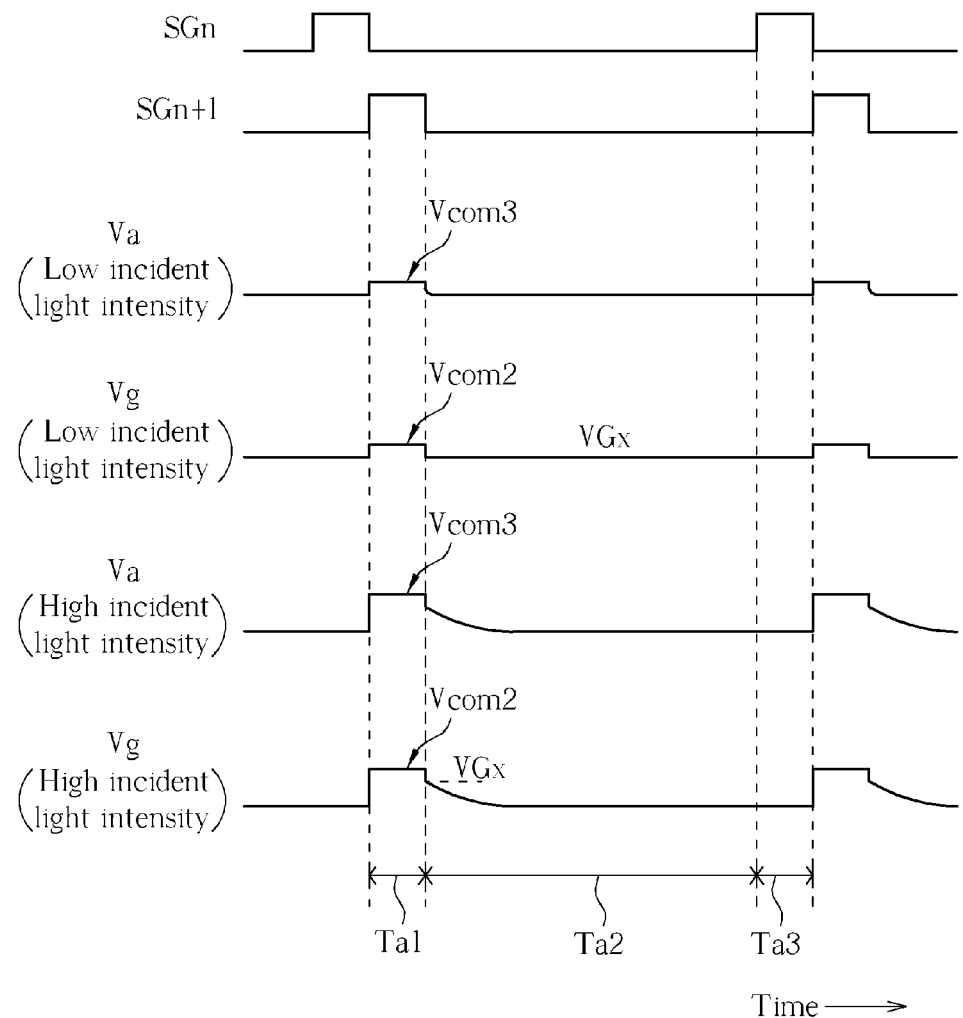
FIG. 4 is a schematic diagram showing related signal waveforms regarding the operation of the liquid crystal display illustrated in FIG. 3, having time along the abscissa.

FIG. 4 is a schematic diagram showing related signal waveforms regarding the operation of the liquid crystal display 200 illustrated in FIG. 3, having time along the abscissa. The signal waveforms in FIG. 4, from top to bottom, are the gate signal SGn, the gate signal SGn+1, the sensing voltage Va corresponding to low incident light intensity, the driving voltage Vg corresponding to low incident light intensity, the sensing voltage Va corresponding to high incident light intensity, and the driving voltage Vg corresponding to high incident light intensity. Referring to FIG. 4 in conjunction with FIG. 3, during an interval Ta1, the third transistor 231 and the fourth transistor 232 are both turned on by the gate signal SGn+1 having high level voltage. At this time, the driving voltage Vg is set to the second common voltage Vcom2, and the sensing voltage Va is set to the third common voltage Vcom3, i.e. the start voltage of the sensing voltage Va is the third common voltage Vcom3. During an interval Ta2, the third transistor 231 and the fourth transistor 232 are both turned off by the gate signal SGn+1 having low level voltage. At this time, the first transistor 221 is utilized for sensing an incident light signal to generate corresponding photocurrent, thereby adjusting the sensing voltage Va. During an interval Ta3, the gate signal SGn having high level voltage is employed to turn on the second transistor 224 for outputting the readout signal Sro_m.

Regarding the operation of the photo-sensing input device DYn_m corresponding to low incident light intensity, because the photocurrent of the first transistor 221 is nearly zero, the sensing voltage Va is substantially fixed during the interval Ta2, and the driving voltage Vg is then substantially retained at a voltage VGx during the interval Ta2. Regarding the operation of the photo-sensing input device DYn_m corresponding to high incident light intensity, the photocurrent of the first transistor 221 can be employed to significantly discharge the first capacitor 222 for pulling down the sensing voltage Va. Further, the second capacitor 233 is employed to pull the driving voltage Vg downward from the voltage VGx through coupling a decrease of the sensing voltage Va. To sum up, in the photo-sensing operation of the photo-sensing input device 210, as the photocurrent/bias-voltage characteristic curve of the first transistor 221 is shifted due to long-term bias/irradiation operation, although the photocurrent of the first transistor 221 corresponding to the same incident light intensity will increase accordingly, the driving voltage Vg can be pulled down due to an increase of the photocurrent, thereby compensating the effect of characteristic curve shift. For that reason, the operation of the photo-sensing input device 210 is able to achieve high input reliability for avoiding an occurrence of input state misjudgment.

Figure 5:
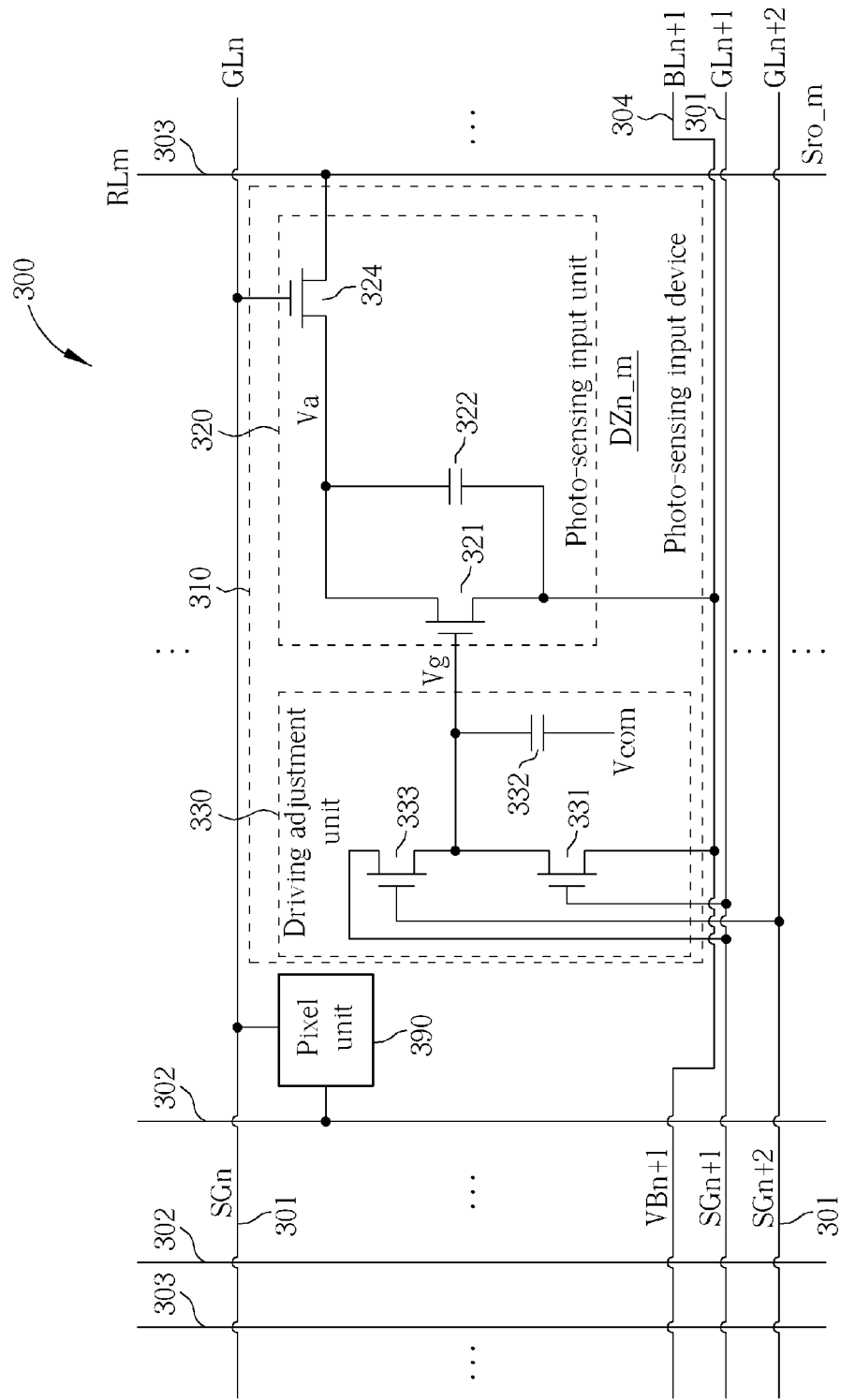
FIG. 5 is a schematic diagram showing a liquid crystal display having photo-sensing input mechanism in accordance with a third embodiment.

FIG. 5 is a schematic diagram showing a liquid crystal display 300 having photo-sensing input mechanism in accordance with a third embodiment. As shown in FIG. 5, the liquid crystal display 300 comprises a plurality of gate lines 301, a plurality of data lines 302, a plurality of readout lines 303, a plurality of bias lines 304, a plurality of pixel units 390, and a plurality of photo-sensing input devices 310. Each gate line 301 is employed to transmit one corresponding gate signal. Each data line 302 is employed to transmit one corresponding data signal. Each pixel unit 390 is employed to output one corresponding image signal through writing one corresponding data signal under the control of one corresponding gate signal. Each bias line 304 is employed to transmit one corresponding bias signal. Each readout line 303, electrically connected to plural photo-sensing input devices 310, is employed to transmit one corresponding readout signal. In the embodiment shown in FIG. 5, each pixel unit 390 is adjacent to one photo-sensing input device 310. In another embodiment, the photo-sensing input devices 310 may be separated by a plurality of gate lines 301 or a plurality of data lines 302, such that not every pixel unit 390 is adjacent to a photo-sensing input device 310. Correspondingly, the bias lines 304 may be separated by a plurality of gate lines 301, or the readout lines 303 may be separated by a plurality of data lines 302.

Each photo-sensing input device 310 includes a photo-sensing input unit 320 and a driving adjustment unit 330. The photo-sensing input unit 320 is utilized for generating a sensing voltage according to a driving voltage and an incident light signal, and further for outputting a readout signal according to the sensing voltage and one gate signal. The driving adjustment unit 330 is utilized for providing the driving voltage according to another two gate signals and the incident light signal. The photo-sensing input unit 320 comprises a first transistor 321, a first capacitor 322, and a second transistor 324. The driving adjustment unit 330 comprises a third transistor 331, a second capacitor 332, and a fourth transistor 333. In the following, photo-sensing input device DZn_m is employed to illustrate interconnections and circuit functions regarding the components in the photo-sensing input devices 310.

The first transistor 321 comprises a first end electrically connected to the bias line BLn+1 for receiving the bias signal VBn+1, a gate end for receiving the driving voltage Vg, and a second end for outputting the sensing voltage Va. The first transistor 321 may be a photo-sensing thin film transistor or a photo-sensing field effect transistor. The first capacitor 322 is electrically connected between the first and second ends of the first transistor 321. The second transistor 324 comprises a first end electrically connected to the second end of the first transistor 321, a gate end electrically connected to the gate line GLn for receiving the gate signal SGn, and a second end for outputting the readout signal Sro_m to the readout line RLm. The second transistor 324 may be a thin film transistor or a field effect transistor. The third transistor 331 comprises a first end electrically connected to the bias line BLn+1 for receiving the bias signal VBn+1, a gate end electrically connected to the gate line GLn+1 for receiving the gate signal SGn+1, and a second end electrically connected to the gate end of the first transistor 321. The third transistor 331 may be a photo-sensing thin film transistor or a photo-sensing field effect transistor. The second capacitor 332 comprises a first end electrically connected to the second end of the third transistor 331, and a second end for receiving a common voltage Vcom. The fourth transistor 333 comprises a first end electrically connected to the gate line GLn+1 for receiving the gate signal SGn+1, a gate end electrically connected to the gate line GLn+2 for receiving the gate signal SGn+2, and a second end electrically connected to the gate end of the first transistor 321. The fourth transistor 333 may be a thin film transistor or a field effect transistor.

Figure 6:
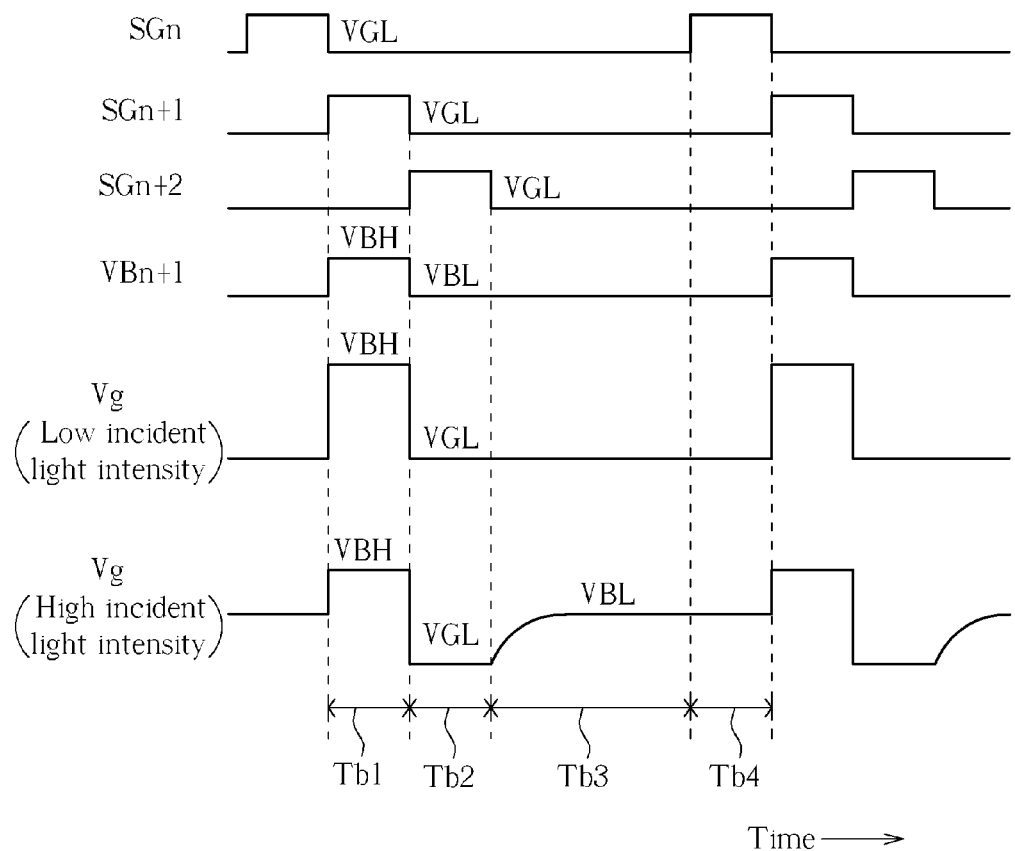
FIG. 6 is a schematic diagram showing related signal waveforms regarding the operation of the liquid crystal display illustrated in FIG. 5, having time along the abscissa.

FIG. 6 is a schematic diagram showing related signal waveforms regarding the operation of the liquid crystal display 300 illustrated in FIG. 5, having time along the abscissa. The signal waveforms in FIG. 6, from top to bottom, are the gate signal SGn, the gate signal SGn+1, the gate signal SGn+2, the bias signal VBn+1, the driving voltage Vg corresponding to low incident light intensity, and the driving voltage Vg corresponding to high incident light intensity. Referring to FIG. 6 in conjunction with FIG. 5, during an interval Tb1, the third transistor 331 is turned on by the gate signal SGn+1 having high level voltage, and the driving voltage Vg is then pulled up to a voltage VBH according to the bias signal VBn+1 at the voltage VBH, thereby turning on the first transistor 321. At this time, the sensing voltage Va is pulled up to a start voltage by the bias signal VBn+1 at the voltage VBH via the first transistor 321. During an interval Tb2, the third transistor 331 is turned off by the gate signal SGn+1 at the low level voltage VGL. Concurrently, the fourth transistor 333 is turned on by the gate signal SGn+2 having high level voltage, such that the driving voltage Vg can be pulled down to the voltage VGL by the gate signal SGn+1 at the low level voltage VGL, thereby turning off the first transistor 321. During an interval Tb3, the fourth transistor 333 is turned off by the gate signal SGn+2 at the low level voltage VGL. At this time, the bias signal VBn+1 is at a voltage VBL greater than the voltage VGL. During an interval Tb4, the gate signal SGn having high level voltage is employed to turn on the second transistor 324 for outputting the readout signal Sro_m.

Regarding the operation of the photo-sensing input device DZn_m corresponding to low incident light intensity, because the photocurrent of the third transistor 331 is nearly zero, the driving voltage Vg is substantially retained at the voltage VGL during the interval Tb3. That is, as the sensing voltage Va decreases from the start voltage through performing a discharging operation of the first capacitor 322, the gate voltage of the first transistor 321 is substantially retained at the voltage VGL, such that the photocurrent of the first transistor 321 can be less than a predetermined threshold. Regarding the operation of the photo-sensing input device DZn_m corresponding to high incident light intensity, the bias signal VBn+1 at the voltage VBL can be employed to significantly charge the second capacitor 332 based on the photocurrent of the third transistor 331, for pulling the driving voltage Vg from the voltage VGL up to the voltage VBL. That is, as the sensing voltage Va decreases from the start voltage through performing a discharging operation of the first capacitor 322, the gate voltage of the first transistor 321 is substantially retained at the voltage VBL greater than the voltage VGL, such that the photocurrent of the first transistor 321 can be greater than the predetermined threshold.

To sum up, in the photo-sensing operation of the photo-sensing input device 310, the driving voltage Vg (VGL) corresponding to low incident light intensity is less than the driving voltage Vg (VBL) corresponding to high incident light intensity, i.e. the voltage applied to the gate of the first transistor 321 is adjusted in response to incident light intensity. In view of that, even through the photocurrent/bias-voltage characteristic curve of the first transistor 321 is shifted due to long-term bias/irradiation operation, by means of applying the voltage VGL significantly lower than the voltage VBL, the photocurrent of the first transistor 321 corresponding to low incident light intensity can be still less than a predetermined threshold, and therefore the operation of the photo-sensing input device 310 is able to achieve high input reliability for avoiding an occurrence of input state misjudgment.

In conclusion, regarding the operation of the photo-sensing input device in the liquid crystal display according to the present invention, the driving voltage thereof can be adjusted in response to incident light intensity, which is employed to provide photocurrent compensation for solving the problem of photocurrent shift caused by a shift of the photocurrent/bias-voltage characteristic curve of the photo-sensing transistor under long-term bias/irradiation operation. That is, the liquid crystal display of the present invention has a high reliable input mechanism for avoiding an occurrence of input state misjudgment, and backend circuit is then able to function properly according to correct input state provided by the photo-sensing input device.

The present invention is by no means limited to the embodiments as described above by referring to the accompanying drawings, which may be modified and altered in a variety of different ways without departing from the scope of the present invention. Thus, it should be understood by those skilled in the art that various modifications, combinations, sub-combinations and alternations might occur depending on design requirements and other factors insofar as they are within the scope of the appended claims or the equivalents thereof.

What is claimed is:

1. A liquid crystal display, comprising:
   a first gate line for transmitting a first gate signal;
   a second gate line for transmitting a second gate signal;
   a data line for transmitting a data signal;
   a pixel unit, electrically connected to the first gate line and the data line, for outputting an image signal according to the first gate signal and the data signal;
   a photo-sensing input unit, electrically connected to the first gate line, for generating a sensing voltage according to a driving voltage and an incident light signal, and for outputting a readout signal according to the sensing voltage and the first gate signal;
a driving adjustment unit, electrically connected to the second gate line and the photo-sensing input unit, for providing the driving voltage according to the second gate signal and the incident light signal; and
a readout line, electrically connected to the photo-sensing input unit, for transmitting the readout signal;
wherein the photo-sensing input unit comprises:
a first transistor having a first end for receiving a first common voltage, a gate end for receiving the driving voltage, and a second end;
a first capacitor, electrically connected between the first and second ends of the first transistor; and
a second transistor having a first end electrically connected to the second end of the first transistor, a gate end electrically connected to the first gate line, and a second end electrically connected to the readout line;
wherein the driving adjustment unit comprises:
a third transistor having a first end for receiving a second common voltage, a gate end electrically connected to the second gate line, and a second end electrically connected to the gate end of the first transistor;
a fourth transistor having a first end for receiving a third common voltage, a gate end electrically connected to the second gate line, and a second end electrically connected to the second end of the first transistor; and
a second capacitor electrically connected between the second end of the third transistor and the second end of the fourth transistor.

2. The liquid crystal display of claim 1, wherein the first transistor is a photo-sensing thin film transistor or a photo-sensing field effect transistor, the second transistor is a thin film transistor or a field effect transistor, the third transistor is a thin film transistor or a field effect transistor, and the fourth transistor is a thin film transistor or a field effect transistor.

3. A photo-sensing input device, comprising:
a photo-sensing input unit, for generating a sensing voltage according to a driving voltage and an incident light signal, and for outputting a readout signal according to the sensing voltage and a first gate signal; and
a driving adjustment unit, electrically connected to the photo-sensing input unit, for providing the driving voltage according to a second gate signal and the incident light signal;
wherein the photo-sensing input unit comprises:
a first transistor having a first end for receiving a first common voltage, a gate end for receiving the driving voltage, and a second end;
a first capacitor, electrically connected between the first and second ends of the first transistor; and
a second transistor having a first end electrically connected to the second end of the first transistor, a gate end for receiving the first gate signal, and a second end for outputting the readout signal;
wherein the driving adjustment unit comprises:
a third transistor having a first end for receiving a second common voltage, a gate end for receiving the second gate signal, and a second end electrically connected to the gate end of the first transistor;
a fourth transistor having a first end for receiving a third common voltage, a gate end for receiving the second gate signal, and a second end electrically connected to the second end of the first transistor; and
a second capacitor electrically connected between the second end of the third transistor and the second end of the fourth transistor.

4. The photo-sensing input device of claim 3, wherein the first transistor is a photo-sensing thin film transistor or a photo-sensing field effect transistor, the second transistor is a thin film transistor or a field effect transistor, the third transistor is a thin film transistor or a field effect transistor, and the fourth transistor is a thin film transistor or a field effect transistor.

* * * * *